FLYING SPOT STORAGE DEVICES USING PHOTO-ELECTRIC READOUT

Filed June 1, 1962

4 Sheets-Sheet 1

Inventors
K. C. JOHNSON
G. G. SCARROTT
By
Cameron, Kerkam & Sutton
Attorneys

Oct. 26, 1965 K. C. JOHNSON ETAL 3,214,595

FLYING SPOT STORAGE DEVICES USING PHOTO-ELECTRIC READOUT

Filed June 1, 1962 4 Sheets-Sheet 2

Inventors
K. C. JOHNSON
G. G. SCARROTT
By
Cameron, Kerkam & Sutton
Attorneys

FLYING SPOT STORAGE DEVICES USING PHOTO-ELECTRIC READOUT

Filed June 1, 1962 4 Sheets-Sheet 3

Inventors
K. C. JOHNSON
G. G. SCARROTT
By
Cameron, Kerkam & Sutton
Attorneys

Inventors
K. C. JOHNSON
G. G. SCARROTT
By
Cameron, Kerkam & Sutton
Attorneys

United States Patent Office 3,214,595
Patented Oct. 26, 1965

3,214,595

FLYING SPOT STORAGE DEVICES USING PHOTO-ELECTRIC READOUT

Kenneth Charles Johnson, Gatley, Cheadle, and Gordon George Scarrott, Wokingham, England, assignors to Ferranti Limited, Hollinwood, England, a company of Great Britain and Northern Ireland Filed June 1, 1962, Ser. No. 199,308
Claims priority, application Great Britain, June 2, 1961, 19,919/61
13 Claims. (Cl. 250—219)

Figure 1:
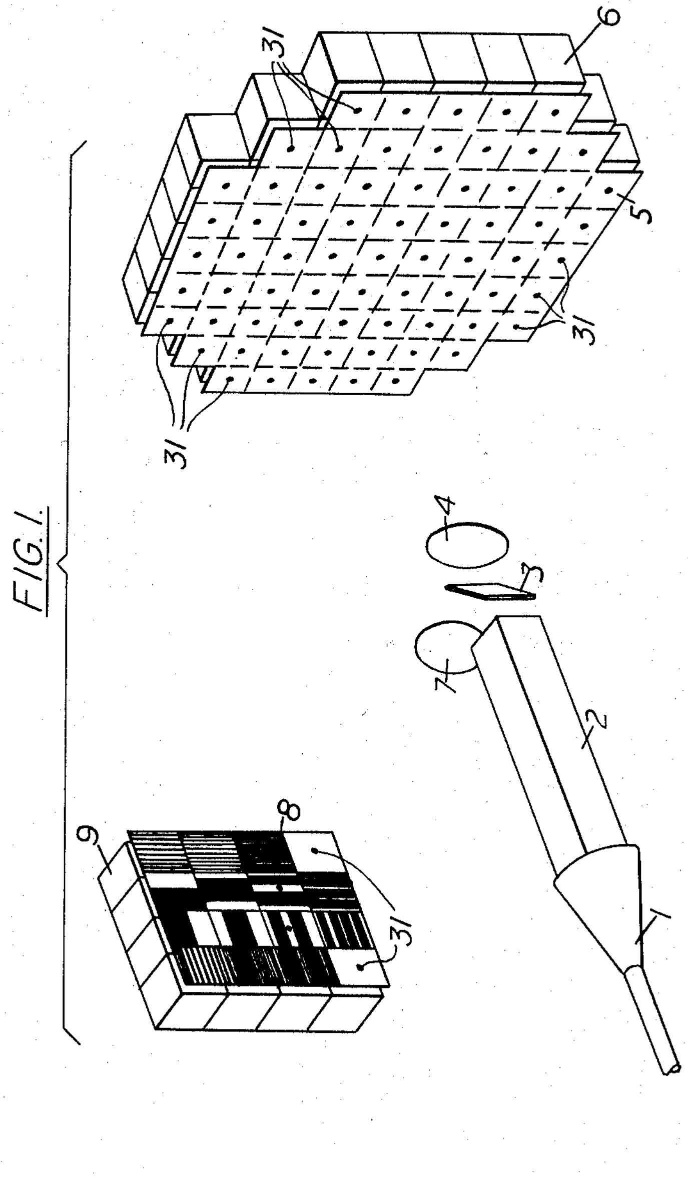

This invention relates to flying spot storage devices.

Flying spot storage devices for use as fixed computer stores are known which includes a cathode-ray tube and beam deflecting means for driving a spot to any one of a defined number of positions forming a matrix on the screen of the cathode-ray tube. An array of lenses is used to project an array of images of the matrix area of the screen of the cathode-ray tube onto a storage plate, which is usually a photographic plate containing information defined by the presence or absence, in each image area of the plate, of transparent dots in positions corresponding to the positions in the matrix on the screen of the cathode-ray tube, a photo-electric cell being arranged behind each image area on the photographic storage plate.

In operation the number of images of the matrix produced by the lens array is made equal to the number of bits in a word plus two or more images for use in connection with the beam deflecting means. When it is required to read a particular word out of the store the beam is driven to the required position and the single spot on the screen of the cathode-ray tube is projected by the array of lenses onto each image area of the photographic storage plate. An output will therefore be derived from each of the photo-electric cells behind an image area in which a transparent dot occurs in the appropriate position and the outputs of the photoelectric cells therefore represents the stored word in parallel form.

To be useful, such flying spot storage devices must hold a large number of words and the spot diameter on the screen of the cathode-ray tube and the diameter of the dots on the photographic storage plate must therefore be made as small as possible.

The dots on the photographic storage plate must be coplanar and since the number of lenses required in a useful store is approximately fifty the outer lenses in the array must be operated at the limit of their angular field of view. It therefore follows that although only one fiftieth of the total number of spots on the storage plate is projected by each lens, the lenses must all be high resolution lenses capable of resolving all of the spots on the storage plate.

Furthermore, the number of bits of information which can be stored in such a device is determined either by the number of dots which can be resolved by the photographic storage plate or by the number of discrete positions of the flying spot which can be resolved by the optical system. In the known system employing an array of lenses the resolution of the optical system is very much poorer than that of the photographic plate even though a large number of expensive high resolution lenses is used.

It is an object of the present invention to provide a flying spot storage device including an optical system in which only one projection lens of high resolution is required.

It is a further object of the invention to provide a flying spot storage device including a compound optical system having a resolution which more nearly matches that of a photographic plate than does the resolution of known optical systems.

According to the present invention a flying spot storage device includes a cathode-ray tube, beam deflecting means for driving a spot to any one of a defined number of positions forming a matrix on the screen of the cathode-ray tube, a storage plate, an optical system comprising two pairs of facing parallel reflecting surfaces forming a cylinder of square cross-section adapted to produce an array of images of the matrix area on the screen of the cathode-ray tube and a lens system adapted to project said array of images onto said storage plate, and a photo-electric cell arranged behind each image area on the storage plate.

Said two pairs of reflecting surfaces may comprise four planar mirrors or they may be formed by the polished surfaces of a square prism of an optically transparent material such as glass.

Said lens system may comprise a projection lens and it may further comprise for each image area on the storage plate a matrix of simple converging lenses corresponding to the matrix of spot positions on the screen of the cathode-ray tube, said matrix of lenses being positioned such that the plane of the projection lens and the plane of said storage plate are conjugate focal planes.

Said matrix of converging lenses may be formed by two mouldings, each moulding being an array of plano-cylindrical lenses with their axes parallel, said mouldings being arranged with the cylindrical lens surfaces in contact and the axes of the lenses of one moulding perpendicular to the axes of the lenses of the other mouldings.

Said optical system may further comprise an adjustable shutter mechanism whereby said projection lens may be obscured apart from a selected one of a number of distinct areas.

Figure 2:
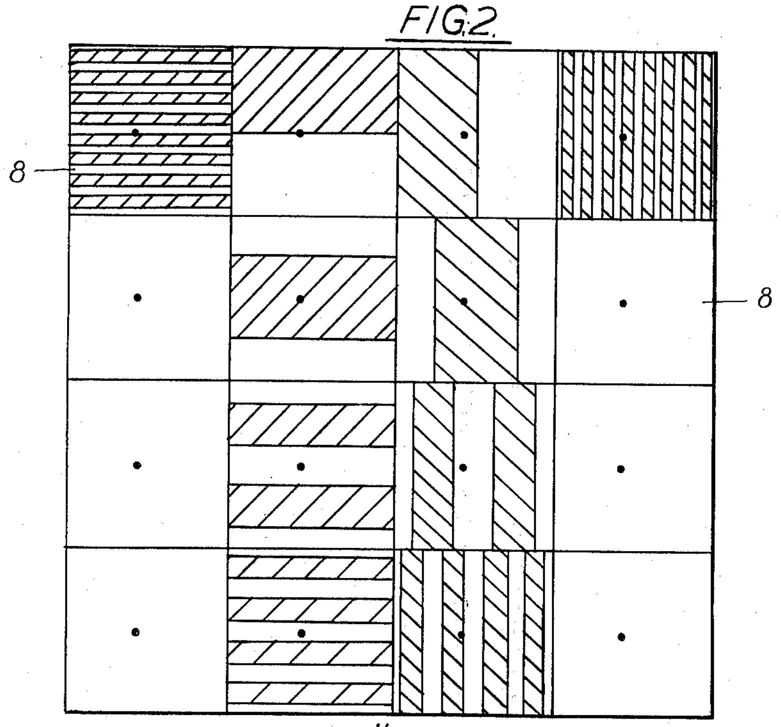
Figure 3:
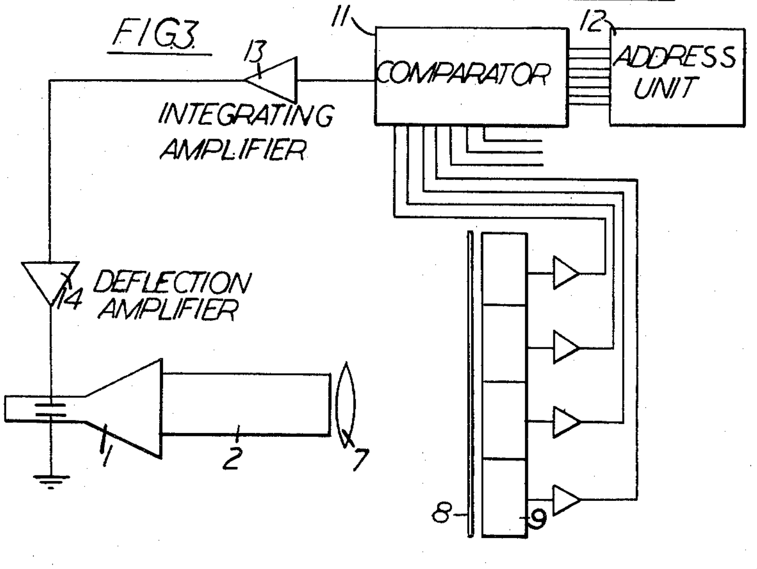
Figures 4, 5:
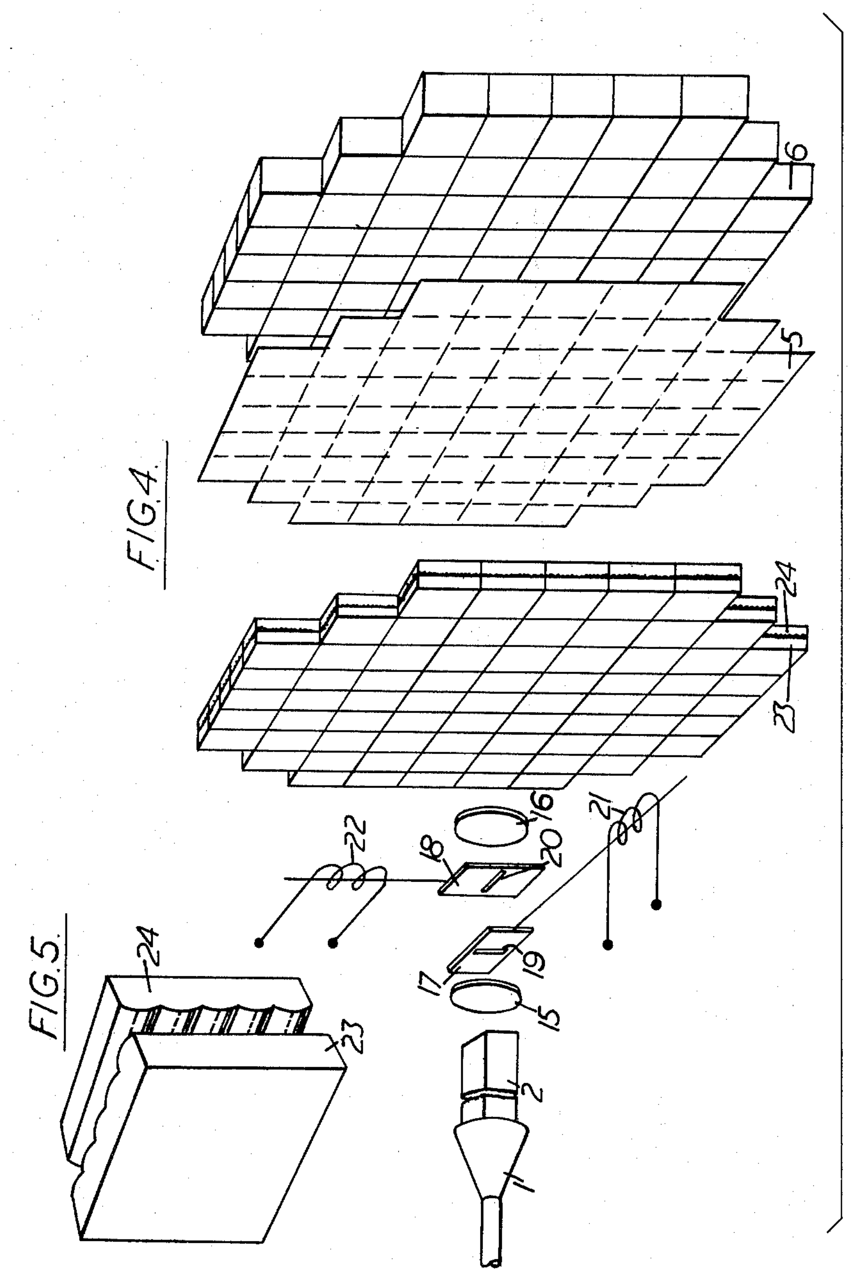
Figures 6, 7:
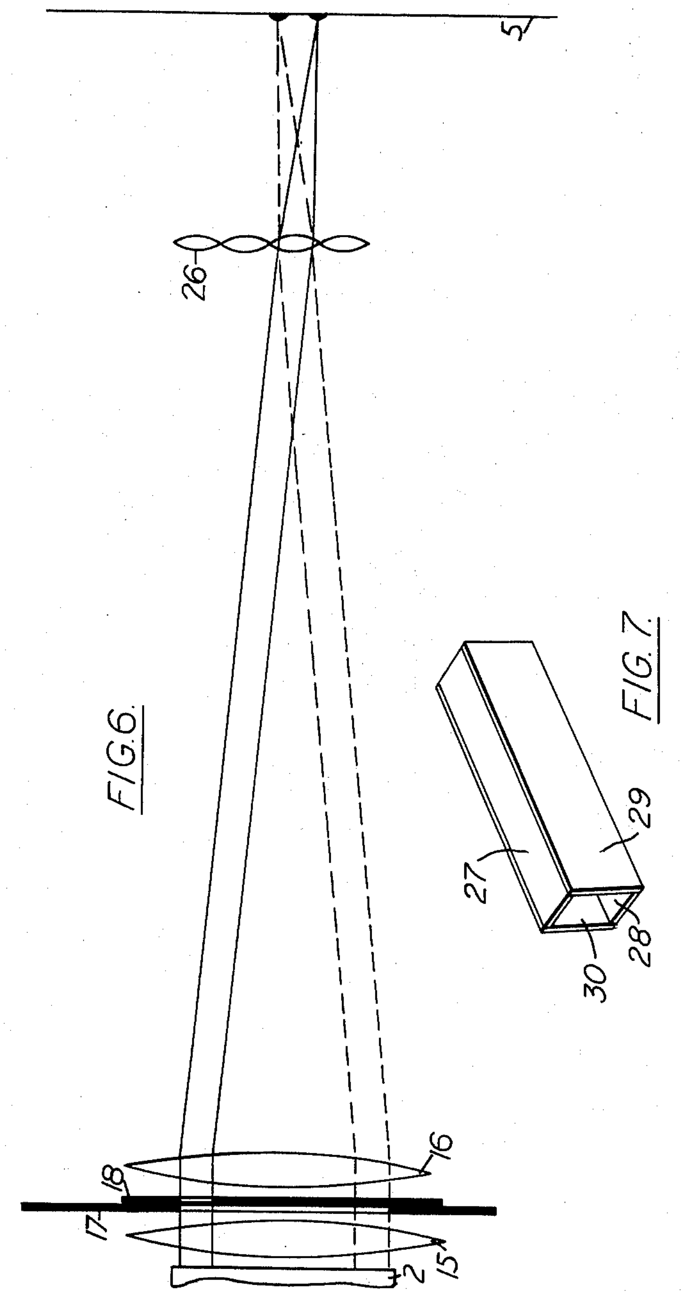

The present invention will now be described by way of example with reference to the accompanying drawings in which:

FIGURE 1 is a perspective view of one form of flying spot storage device in accordance with the invention, FIGURE 2 is a detailed view of code plates shown in FIGURE 1, FIGURE 3 is a schematic drawing showing beam deflecting means used in the device shown in FIGURE 1, FIGURE 4 is a perspective view of a further form of flying spot storage device in accordance with the invention, FIGURE 5 is an enlarged detail of part of FIGURE 4, FIGURE 6 is a diagrammatic drawing showing the operation of the optical system shown in FIGURE 4, and FIGURE 7 is a perspective view of four planar mirrors arranged as two facing pairs.

Referring now to FIGURE 1 of the drawings the flying spot storage device shown includes a cathode-ray tube 1 the beam of which may be deflected by beam deflection means, to be described later, to produce a spot of light in any one of a defined number of positions forming a matrix on the screen of the cathode-ray tube. A glass cylinder 2 of square cross-section is placed in front of the screen of the cathode-ray tube 1, the cross-section of the cylinder 2 being larger than the matrix area on the screen of the cathode-ray tube. The sides of the cylinder 2 are highly polished and form two pairs of facing parallel reflecting surfaces such that an array of images of the matrix area on the screen of the cathode-ray tube are formed by multiple reflections in the sides of the cylinder 2. A half-silvered glass plate 3 is positioned at the free end of the cylinder 2 at 45° to the axis of the cylinder 2. A first projection lens 4 focuses light passing through the plate 3 onto a photographic plate 5 behind which is positioned an assembly 6 of photo-electric cells. A second projection lens 7 focuses light reflected by the plate 3 onto a group of code plates 8 behind which is positioned a further assembly 9 of photo-electric cells.

In operation the glass cylinder 2 forms multiple images of a light-spot on the screen of the cathode-ray tube. The number of images produced is infinite, but in the storage device shown it is required to produce sixty-nine images of the matrix area of the screen of the cathode-ray tube on the photographic plate 5, these images being arranged in nine columns, five of which columns each contain nine images, two of which columns each contain seven images and the remaining two of which columns each contain five images forming an approximately circular array as shown by the dotted lines on the plate 5. The sixty-nine light-spots required are therefore produced by only four reflections in each side of the cylinder 2 and the intensity of the fourth image in each side is only slightly less than the intensity of the spot which passes through the cylinder 2 without reflection. The array of images formed by the cylinder 2 is focused onto the plate 5 by the lens 4 to produce a light spot 31 in a corresponding position in each of the image areas on the plate 5.

The possible spot positions on the screen of the cathode-ray tube are in a matrix of 128 by 128 positions giving 16,384 possible positions for the spot. The spot 31 in each image area on the plate 5 is therefore also positioned in a corresponding one of 16,384 possible positions. The plate 5 contains stored information defined by the presence or absence in each of these positions of a transparent dot, this information being written into the store prior to its use as a read out device by masking the appropriate ones of the image areas on the plate 5 and exposing the remaining area with the spot in the required position on the screen of the cathode-ray tube. When reading information from the store the presence of a transparent dot in the appropriate position in a particular one of the image areas on the plate 5 causes an output from the photo-electric cell immediately behind that image area. The outputs from the photo-electric cells in the assembly 6 therefore represent in parallel form the word of information stored in that position, or address, the word being composed of up to sixty-nine bits.

The images projected onto the plate 5 should be free of distortion and should not vary in intensity by more than twenty percent; it is therefore desirable that the field of view of the lens 4 should be restricted to a semi-angle of fifteen degrees. In this embodiment each image should therefore subtend an angle of approximately four degrees and to achieve this the length of the cylinder 2 is made approximately fifteen times the width of the cylinder.

The code plates 8 and the photo-electric cells 9 are used in the beam deflecting means. The code plates 8 are shown in greater detail in FIGURE 2 from which it will be seen that the plates 8 are divided into two groups of eight plates each. In each group seven of the plates are coded in a cyclic progressive code to indicate the position of the spot on the screen of the cathode-ray tube 1, the left hand group of plates giving an indication of the vertical position and the right hand group of plates giving an indication of the horizontal position. The use of seven code plates in each group (only five plates are shown coded in FIGURE 2 for the sake of clarity) defines $2^7$ or 128 positions of the beam, the cyclic progressive code being used rather than a binary code since in a change to an adjacent position only one digit changes.

The beam deflection means for the vertical channel are shown schematically in FIGURE 3. The outputs from the seven photo-electric cells 9 in the vertical channel are connected through amplifiers to one group of inputs in a comparator 11. The other group of inputs in the comparator 11 are connected to an address unit 12 and the output of the comparator 11 is applied through an integrating amplifier 13 to a deflection amplifier 14 the output of which is applied to the vertical deflection plates in the cathode-ray tube 1.

In operation the required address is set up in the address unit 12 and the output compared with the output from the photo-electric cells 9 in the vertical channel. The output from the comparator 11 is integrated and applied to deflect the beam in such a direction as to reduce the difference until the outputs from the address unit 12 and the photo-electric cells 9 are the same, the beam then being in the required vertical position. The horizontal positioning of the beam is controlled in a similar manner, the beam thus being driven to any required one of the 16,384 spot positions.

The code plates 8 need not necessarily be separated from the storage plate 5 in the manner just described. They could, for example, be positioned as a further row and column in the array on the plate 5, but the use of the half-silvered plate 3 and the lens 7 enables the code plates to be positioned close to the optical axis of the system where the operation of the lens is usually more satisfactory.

The beam positioning system just described is only one of several possible systems. Other systems are fully described in the Bell System Technical Journal, March 1959, page 365 et seq.

FIGURE 4 shows a further embodiment of the invention which again includes a cathode-ray tube 1, a glass cylinder 2, a photographic storage plate 5 and an array of photo-electric cells 6. The beam deflecting means are similar to the means proviously described and are therefore not shown. In this embodiment the main projection lens includes two components 15 and 16 between which are mounted two shutters 17 and 18, the shutter 17 containing a vertical slot 19 and the shutter 18 containing a horizontal slot 20. The shutters 17 and 18 are controlled by electromagnetic means 21 and 22 respectively by which means each shutter may be driven to any one of eight possible positions. The lens 15 may therefore be obscured apart from any one of 64 possible areas defined by the intersection of the slots 19 and 20.

In front of each image area on the plate 5 are mounted two arrays 23 and 24 of plano-cylindrical lenses with their axes parallel formed by moulding from a transparent material. Each array includes the same number of lenses as there are rows or columns in the matrix of spot positions on the screen of the cathode-ray tube 1 and the mouldings are mounted with the cylindrical lens surfaces in contact and the axes of the lenses of the moulding 23 perpendicular to the axes of the lenses of the moulding 24. This may be clearly seen in FIGURE 5 which is an enlarged view of part of the two mouldings 23 and 24. When positioned in this manner the two mouldings 23 and 24 form a matrix of simple converging lenses corresponding to the matrix of spot positions on the screen of the cathode-ray tube 1. The mouldings 23 and 24 are positioned such that for the converging lenses formed the plane of the projection lens 15 and the plane of the storage plate 5 are conjugate focal planes.

The optical system so formed is shown in FIGURE 6 in which the two mouldings 23 and 24 are represented by the converging lenses 26. In operation, in the absence of the shutters 17 and 18, if the beam is deflected to produce a spot at the co-ordinate XY in the matrix of spot poistions the Xth lens in the Yth row of each array of lenses will be illuminated. From these particular lenses the whole surface of the main projection lens will appear bright and each of these particular lenses will therefore produce a minified image of the main projection lens on the storage plate 5. The interposition of the shutters 17 and 18 reduces the size of the image produced and permits several images to be produced according to the positions of the shutters 17 and 18. FIGURE 6 illustrates two extreme positions of the spot for two extreme positions of the shutter 18 in the case of one particular lens 26. The final image produced on the photographic storage plate 5 is extremely small and the accuracy of location is determined primarily by the accuracy of location of the array of sub lenses 26 with respect to the storage plate 5.

The use of the shutters 17 and 18 and the array of lenses produced by the mouldings 23 and 24 thus considerably increases the storage capacity of the device; in the present embodiment by 64 times. The operation of the shutter mechanism, however, is slow by computer standards and the store is therefore not generally suitable where random access is required. Where, however, sequences of words read from the store are usually consecutive, as in reading a program, the store may be designed such that the sequences of words occur with the shutter mechanism in one position and the shutter mechanism may then be operated to select a further sequence during the time in which the computer is working on the previous sequence of words read from the store.

If it is desired to position the beam deflection code plates in the plane of the storage plate 5 in the embodiment described with reference to FIGURE 4, the shutters 17 and 18 would severely reduce the intensity of the light spots focused onto the code plates. This is very undesirable and may be avoided by making the shutters 17 and 18 of a polarising material provided with slots 19 and 20 as before. The shutters 17 and 18 are arranged such that the light passing through each of them is polarised in the same direction, e.g., horizontally, the light passing through both slots 19 and 20 remaining non-polarised. A sheet of polarising material is placed in front of the array of lenses formed by the mouldings 23 and 24 and is arranged with its direction of polarisation at right angles to that of the shutters 17 and 18. No polarising material is placed in front of the code plates. Light reaching the array of lenses will therefore only be that which has passed through both of the slots 19 and 20 and the lenses will therefore operate as described with reference to FIGURE 6. The light falling on the code plates, however, will be the total light passing through the shutters 17 and 18 and the intensity will therefore be reduced by only one half.

The devices described above may be varied in many ways. For example, as shown in FIGURE 7, the glass cylinder 2 may be replaced by four planar mirrors 27–30 arranged as two pairs of facing parallel reflecting surfaces forming a cylinder of square cross-section. Furthermore, the storage plate has been described as a photographic plate but it may be made of any other composition which is such that information may be written into or read out of the store by the use of a beam of light.

What we claim is:

1. A flying spot storage device including a cathode-ray tube having a screen and beam deflecting means for driving a spot to any one of a defined number of positions forming a matrix area on said screen, an optical system including two pairs of facing parallel reflecting surfaces forming a cylinder of square cross-section adapted to produce an array of images of the matrix area formed on the screen of the cathode-ray tube, one end of said cylinder being positioned in front of said screen, a storage plate positioned beyond the other end of said cylinder, said optical system further including a lens system disposed between the other end of said cylinder and the storage plate adapted to project said array of images onto said storage plate, and a photoelectric cell arranged behind each image area on the storage plate.

2. A flying spot storage device including a cathode-ray tube having a screen and beam deflecting means for driving a spot to any one of a defined number of positions forming a matrix area on said screen, an optical system including a plurality of pairs of facing parallel reflecting surfaces forming a cylinder having a cross-section larger than said matrix adapated to produce an array of images of said area, one end of said cylinder being positioned in front of said screen, a storage plate positioned beyond the other end of said cylinder, said optical system further including a lens system disposed between the other end of said cylinder and the storage plate adapted to project said array of images onto said storage plate, and a photo-electric cell arranged behind each image area on the storage plate.

3. A flying spot storage device including a cathode-ray tube having a screen and beam deflecting means for driving a spot to any one of a defined number of positions forming a matrix area on said screen, an optical system including at least two pairs of parallel reflecting surfaces forming a cylinder having a cross-section larger than said matrix area adapted to produce multiple images of the spot on the screen of said cathode-ray tube, one end of said cylinder being positioned in front of said screen, a storage plate positioned beyond the other end of said cylinder, said optical system further including a lens system disposed between the other end of said cylinder and the storage plate adapted to project said multiple images onto said storage plate, and a photo-electric cell arranged behind each image area on the storage plate.

4. A flying spot storage device including a cathode-ray tube having a screen and beam deflecting means for driving a spot to any one of a defined number of positions forming a matrix area on said screen, an optical system including at least two pairs of facing parallel reflecting surfaces forming a cylinder having a cross-section larger than said matrix area adapted to produce an array of images of said area, one end of said cylinder being positioned in front of said screen, a storage plate positioned beyond the other end of said cylinder, a half-silvered glass plate positioned at the other end of said cylinder at approximately 45° to the axis of said cylinder, said optical system further including a lens system having a first projection lens for focusing light passing through said glass plate onto said storage plate, said lens system being disposed between the other end of said cylinder and the storage plate to project said array of images onto said storage plate, and a photo-electric cell arranged behind each image area on said storage plate.

5. A flying spot storage device as claimed in claim 1 in which said storage plate is a photographic plate.

6. A flying spot storage device as claimed in claim 1 in which said two pairs of facing parallel reflecting surfaces are formed by the polished surfaces of a square prism of an optically transparent material.

7. A flying spot storage device as claimed in claim 1 in which said lens system comprises a projection lens.

8. A flying spot storage device as claimed in claim 7 in which said lens system further comprises for each image area on said storage plate a matrix of simple converging lenses corresponding to the matrix of spot positions on the screen of said cathode-ray tube, said matrix of lenses being positioned such that the plane of the projection lens and the plane of said storage plate are conjugate focal planes.

9. A flying spot storage device as claimed in claim 8 in which said matrix of converging lenses is formed by two mouldings, each moulding being an array of plano-cylindrical lenses with their axes parallel, said mouldings being arranged with the cylindrical lens surfaces in contact and the axes of the lenses of one moulding perpendicular to the axes of the lenses of the other moulding.

10. A flying spot storage device as claimed in claim 8 in which said optical system further comprises an adjustable shutter mechanism comprising first and second superimposed planar shutters each containing a longitudinal aperture, the aperture in said first shutter extending in a direction perpendicular to the direction of the aperture in said second shutter, and means for moving each of said shutters in its plane in a direction perpendicular to the aperture contained therein, whereby said projection lens may be obscured apart from a selected one of a number of distinct areas.

11. A flying spot storage device as set forth in claim 3 wherein the number of multiple images of the spot formed on the screen of the cathode-ray tube is infinite.

12. A flying spot storage device as set forth in claim 3 wherein the number of multiple images of the spot projected onto the storage plate is 69, said images being arranged in a plurality of columns, the two outermost columns each containing a lesser number of images than the columns therebetween.

13. The flying spot storage device as set forth in claim 4 further including a second projection lens for focusing light reflected by said half-silvered mirror onto a group of code plates, and a photo-electric cell arranged behind each of said code plates.

References Cited by the Examiner

UNITED STATES PATENTS

| | | | |
|---|---|---|---|
| 3,018,689 | 1/62 | Saxe | 88—1 X |
| 3,036,153 | 5/62 | Day | 250—219 |
| 3,059,538 | 10/62 | Sherwood et al. | 340—146.3 X |
| 3,084,453 | 4/63 | Brown | 88—1 |
| 3,125,683 | 3/64 | Stewart et al. | 250—219 |

RALPH G. NILSON, *Primary Examiner.*

WALTER STOLWEIN, *Examiner.*